United States Patent
Contractor

(10) Patent No.: US 6,879,676 B1
(45) Date of Patent: Apr. 12, 2005

(54) SYSTEM AND METHOD FOR ROUTING A CALL TO AN OPTIMAL LOCATION

(75) Inventor: Sunil H. Contractor, Marietta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 715 days.

(21) Appl. No.: 09/606,063

(22) Filed: Jun. 29, 2000

(51) Int. Cl.[7] .............................................. H04M 3/42
(52) U.S. Cl. ........................... 379/211.01; 379/211.02; 379/211.14; 379/88.18
(58) Field of Search ....................... 379/88.16, 88.18, 379/201.01, 201.02, 201.06, 207.02, 207.12, 211.01, 211.02, 212.01, 219, 220.01, 221.14

(56) References Cited

U.S. PATENT DOCUMENTS

| | | | | |
|---|---|---|---|---|
| 4,757,267 A | * | 7/1988 | Riskin | 379/211.02 |
| 5,396,536 A | * | 3/1995 | Yudkowsky | 379/93.11 |
| 5,588,048 A | * | 12/1996 | Neville | 379/211.02 |
| 5,963,861 A | * | 10/1999 | Hanson | 455/456.1 |
| 6,091,810 A | * | 7/2000 | Shaffer et al. | 379/211.02 |
| 6,163,597 A | * | 12/2000 | Voit | 379/211.01 |
| 2002/0136381 A1 | * | 9/2002 | Shaffer et al. | 379/201.02 |

* cited by examiner

Primary Examiner—Fan Tsang
Assistant Examiner—Ovidio Escalante
(74) Attorney, Agent, or Firm—Merchant & Gould

(57) ABSTRACT

The present invention is a system and method for routing a call using the GIS technologies. The method comprises the following steps: First, a call intended for a subscriber of the optimal location call routing service is received at an SSP. Second, a query is launched to an SCP for call routing instruction. Third, the SCP consults a system that is based on the GIS technology to determine the telephone number of the optimal location. Fourth, the database provides the telephone number of the optimal location for the SCP to complete the call. Communication between the SCP and the GIS system are via an application over the TCP/IP protocol. An apparatus for implementing the method is also described.

5 Claims, 4 Drawing Sheets

SYSTEM AND METHOD FOR ROUTING A CALL TO AN OPTIMAL LOCATION

BACKGROUND

1. Field of the Invention

The present invention relates generally to a system and method for routing a telephone call, and more particularly to a system and method for routing a telephone call from a calling party to a called party's optimal location.

2. Background of the Invention

An organization with a large number of locations often subscribes to a "closest location call routing" service from its telephone company. The closest location call routing service terminates a call intended for the organization (the subscriber) to the subscriber's location that is physically closest to the caller. The closest location call routing service is particularly useful to a subscriber having multiple locations scattered throughout a large geographical area. The service is useful to the subscriber because the subscriber needs to advertise only one designated telephone number for all of its multiple locations. A caller dialing the designated telephone number of the subscriber will always be connected to a location that is physically closest to the caller, no matter where the caller originated the call from.

Currently, the closest location call routing service is implemented as follows: First, a database is created at a service control point (SCP). The database associates a calling number with its location based on the zip code, the wire center, or other area-related granularity of the caller. The database at the SCP (referred herein as "the SCP database") identifies a forwarding telephone number (or the route-to number) based on a customer's desired granularity. For example, if the desired granularity is based on zip codes, all calls originating from an area within the same zip code are routed to the same forwarding telephone number.

The SCP database also contains one designated telephone number and all other telephone numbers of the subscriber. For example, a subscriber having four service locations, one in each of a city's four quadrants, may select "555-5555" as the designated telephone number, for all calls intended for its northwest, northeast, southeast, and southwest locations having actual telephone numbers of "111-1111," "222-2222," "333-3333," and "444-4444," respectively. When a call is received from a caller dialing the designated telephone number, the SCP database is queried to determine which of the subscriber's four telephone numbers should be used to route the call. In the above example, the SCP database and the SCP are programmed such that a caller dialing "555-5555" from the northwest quadrant of the city will be connected to the subscriber's northwest location that has the telephone number "111-1111." Similarly, another caller who is physically located in the subscriber's southeast quadrant of the city who dials "555-5555" will be routed to the southeast branch having the "333-3333" telephone number.

In the prior art systems, the closest location of the called party is determined based on the SCP database or other huge databases. Other prior art systems locate the caller by using the identity of the central office of the caller, or by looking up the caller's zip code based on the caller's telephone number. These applications have limited level of granularity. For example, a subscriber cannot divide a zip code such a way that half of the calls from that zip code are routed to location A and the other half of the calls are routed to location B. Furthermore, a zip code may cover a large geographical region.

Existing closest location call routing systems that rely on SCP databases have the following disadvantages. First, a subscriber to the service must work with a third-party vendor to generate the needed information for the SCP. The third party usually converts data from Geographic Information Systems (GIS) format to a different format suitable for the database at the SCP. In doing so, much of the advantages of the GIS technology is lost due to data format conversion. Second, periodic updates to the SCP database are needed due to, among other things, area code changes, expansion of the subscriber's market, and addition or deletion of subscriber locations. Third, the positioning of the caller and the closest location determination is limited to fixed granularity like zip code or wire center based on a caller's NPA-NXX-XXXX. Fourth, the existing systems require one or more huge databases at the SCP. Fifth, maintenance of the SCP database is difficult and expensive. Sixth, the location-finding algorithms at the SCP are complex and difficult to implement. In short, relying on the SCP alone for closest location call routing is inefficient.

SUMMARY OF THE INVENTION

The present invention is a system and method for routing a telephone call from a caller to a subscriber's optimal location. The optimal location in one embodiment is the location that is physically closest to the caller. The optimal location in another embodiment is determined by other criteria, e.g., least travel time or any random area boundary. The present invention overcomes the disadvantages of the prior art by integrating the GIS technology with the telephony for call routing. The method of present invention comprises the following steps. First, a call from a caller intended for the subscriber triggers a query at a service switching point (SSP). The SSP then queries a service control point (SCP) for call routing instructions. Next, the SCP consults a system that is based on the GIS technology (the GIS system) to obtain a forwarding telephone number of the optimal location. Upon receiving the forwarding telephone number of the optimal location, the SCP routes the call to the optimal location. If the forwarding telephone number is not received, the call is routed to a default location. The forwarding telephone number is obtained by the GIS system based in part on the information provided to the GIS system by the SCP. The information may include one or more of the following: the caller's telephone number, the caller's street address, and the caller's X-Y coordinates.

It is an object of the present invention to integrate GIS technology with the telephony for calling routing.

It is another object of the present invention to provide the optimal location call routing service that is easy to maintain.

It is another object of the present invention to eliminate the need for a huge database at the SCP.

It is another object of the present invention to eliminate the location-finding algorithms at the SCP.

It is another object of the present invention to eliminate the need for the subscriber to work with a third-party vendor to create the database at the SCP.

It is another object of the present invention to provide the optimal location call routing service without having to make periodic updates to the database at the SCP.

It is another object of the present invention to allow subscribers to update their own databases provisioned on a system based on GIS technology.

It is another object of the present invention to let the subscriber define boundary of areas not limited to zip codes or wire centers.

DETAILED DESCRIPTION OF THE INVENTION

Figure 1A:
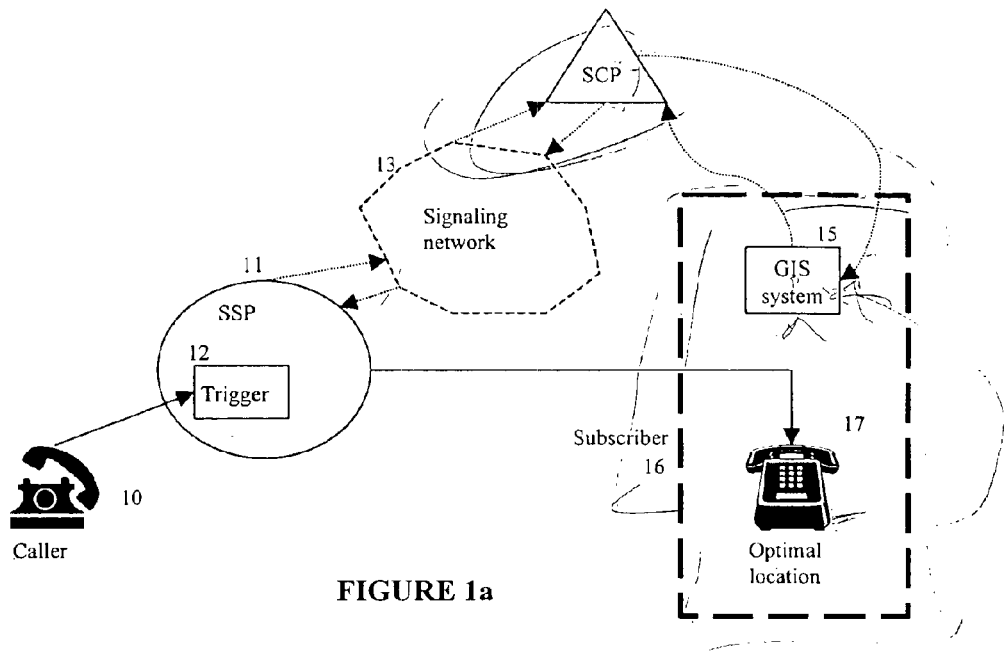
FIG. 1a is a schematic diagram illustrating an overview of a first preferred embodiment of the present invention.

FIG. 1a is a schematic diagram illustrating an overview of a first preferred embodiment of the present invention. The present invention uses the Advanced Intelligent Network (AIN) and Geographic Information Systems (GIS) technology for optimal location call routing. The system comprises SSP 11, trigger 12, SCP 14, and GIS system 15. Any known trigger may be used as trigger 12. In the preferred embodiment, trigger 12 is a Public Office Dialing Plan (PODP) trigger that is provisioned at SSP 11. GIS system 15 is a system that is based on GIS technology. GIS system 15 contains electronic maps and related data. GIS system 15 may be maintained by any entity. In the preferred embodiment, GIS system 15 is maintained by subscriber 16.

Communications among SSP 11, SCP 14, and GIS system 15 may be established via any known signaling systems or protocols. In the preferred embodiment, communications between SSP 11 and SCP 14 are via Signaling System 7 (SS7), which is shown as Signaling Network 13 in FIG. 1a. Communications between SCP 14 and GIS system 15 are preferably established via an application over the TCP/IP protocol. The present invention routes a call from caller 10 (the calling party) to the optimal location 17 of subscriber 16 (the called party). In doing so, any criteria may be preferably established to determine the optimal location. In the preferred embodiment, the optimal location is the location that is physically closest (ide, shortest route) to caller 10. In another embodiment, the optimal location is the location that has the least travel time from the calling party. A practical application of this embodiment is for a pizza delivery business that relies on quick delivery of pizzas. Naturally, the optimal location for pizza delivery is the pizza kitchen that has the least travel time to get to caller 10.

Figure 1B:
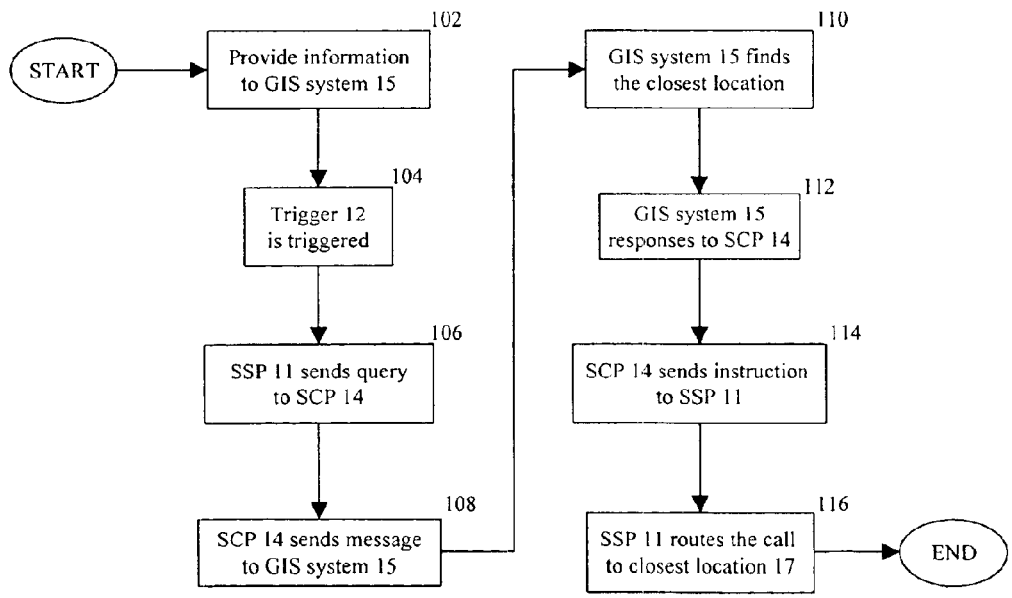
FIG. 1b is a flowchart illustrating the steps involved in using the first preferred method of the present invention to locate the closest location.

FIG. 1b is a flowchart illustrating the steps involved in using the first preferred method of the present invention to locate the closest location. In step 102, information is provided to GIS system 15. Information provided to GIS system 15 may include, among other things, telephone number to X-Y coordinate mapping, street address to X-Y coordinate mapping, electronic maps, and related data regarding subscriber 16's market. Much of the information in GIS system 15 is readily available commercially. In the preferred embodiment, GIS system 15 contains the telephone numbers and X-Y coordinates of all locations of subscriber 16. Any known X-Y coordinate systems may be used. In the preferred embodiment, the X-Y coordinates in GIS system 15 are latitudes and longitudes. GIS system 15 contains sufficient information to determine the X-Y coordinates of a majority of the locations within the market served by subscriber 16. For example, GIS system 15 may contain one or more of telephone numbers, street addresses, and X-Y coordinates of most potential calling parties. The market may be defined based on geographical boundaries. The market may also be defined based on other demographic profiles.

In step 104, a call from caller 10 (the calling party) is received at SSP 11. If the call is intended for subscriber 16 (the called party), i.e., caller 10 dialed the designated telephone number of subscriber 16, trigger 12 is triggered. Any known trigger may be used as trigger 12. In the preferred embodiment, trigger 12 is a PODP trigger that is provisioned at SSP 11. In step 106, SSP 11 sends a query to SCP 14. The query may be sent via any known methods. In the preferred embodiment, the query is an SS7 query. The query contains, among other things, (1) the called number, which is the designated telephone number of subscriber 16, (2) the calling number which is the telephone number of caller 10, and (3) a unique transaction identification to identify the call instance.

In step 108, when SCP 14 receives the query that contained the designated telephone number as the called number, SCP 14 sends a message to GIS system 15 to get a forwarding telephone number of the optimal location, i.e., the location that is closest to caller 10. Messaging from SCP 14 to GIS system 15 may be done using any known methods or protocols. In the preferred embodiment, an application over the TCP/IP protocol is used. The message from SCP 14 to GIS system 15 contains information needed by GIS system 15 to retrieve the forwarding telephone number. In step 110, GIS system 15 uses the information contained in the message to find the closest location of subscriber 16 and the associated forwarding telephone number of the closest location.

The determination of the closest location in step 110 depends on the type of information contained in the message received from SCP 14. For example, if the message received from SCP 14 contains the X-Y coordinates of caller 10, GIS system 15 simply uses the X-Y coordinates of caller 10 to find the forwarding telephone number. If the message received from SCP 14 contains a street address of caller 10, GIS 15 database uses the street address of caller 10 to find the X-Y coordinates of caller 10 first before determining the forwarding telephone number. Similarly, if only the telephone number of caller 10 (the calling number) is received, GIS system 15 uses the calling number to find the X-Y coordinates of caller 10, and then retrieves the forwarding telephone number.

In the preferred embodiment, the message from SCP 14 contains the calling number, and GIS system 15 uses the calling number to retrieve the forwarding telephone number. The retrieval of the forwarding telephone number may be performed using any known methods or algorithms. The algorithms or rules for use in GIS system 15 may be defined by any entity. In the preferred embodiment, the algorithms or rules are defined by subscriber 16. In the preferred embodiment, the determination of the closest location is made based on the X-Y coordinates of caller 10. Comparisons of the X-Y coordinates of caller 10 and the X-Y coordinates of all the locations of subscriber 16 are then made. Finally, the location of subscriber 16 that is physically closest to caller 10 is determined, and the telephone number of the closest location (the forwarding telephone number) is found. In the preferred embodiment, the optimal location is determined based on a shortest distance algorithm. In another embodiment, a least travel time algorithm is used.

In step 112, GIS system 15 responds to SCP 14, providing the forwarding telephone number. The message from GIS system 15 to SCP 14 may be conveyed via any known method or protocols. In the preferred embodiment, an application over the TCP/IP protocol is used. When SCP 14 receives the message from GIS system 15, SCP 14 instructs SSP 11 in step 114 to route the call to the closest location. In the example shown in FIG. 1a, the closest location is optimal location 17. The call is completed in step 116 in which SSP 11 routes the call to optimal location 17.

Figure 2A:
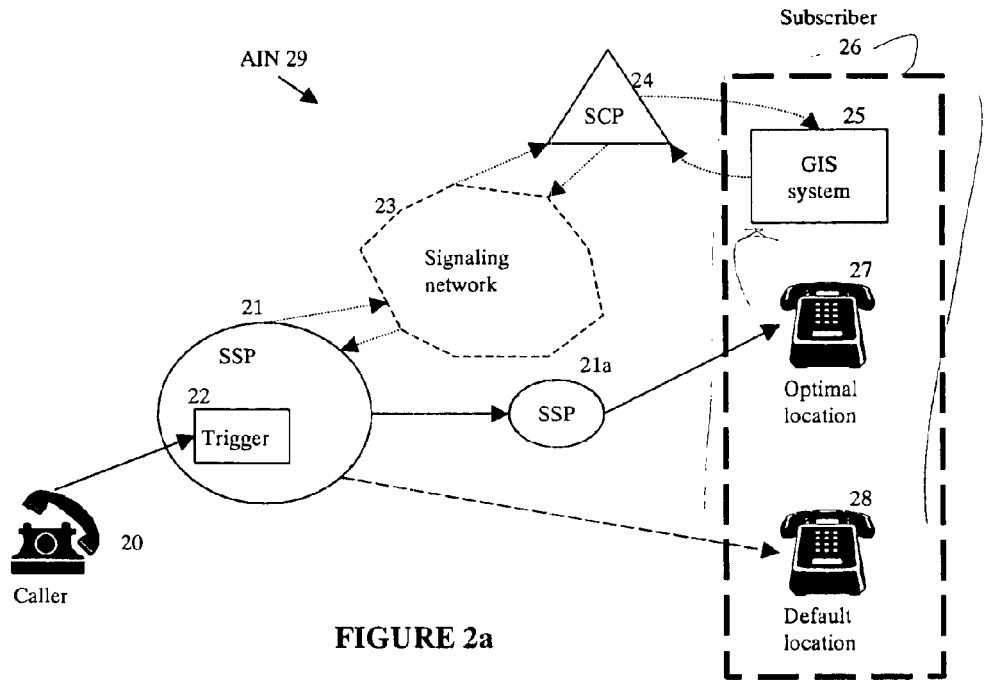
FIG. 2a is a schematic diagram illustrating the architecture of a second preferred embodiment of the present invention.

FIG. 2a is a schematic diagram illustrating the architecture of a second preferred embodiment of the present invention. The second preferred embodiment shown in FIG. 2a is similar to the first preferred embodiment shown in FIG. 1a except optimal location 27 of subscriber 26 (the called party) is not necessarily the physically closest location or the least travel time location to caller 20 (the calling party).

Figure 2B:
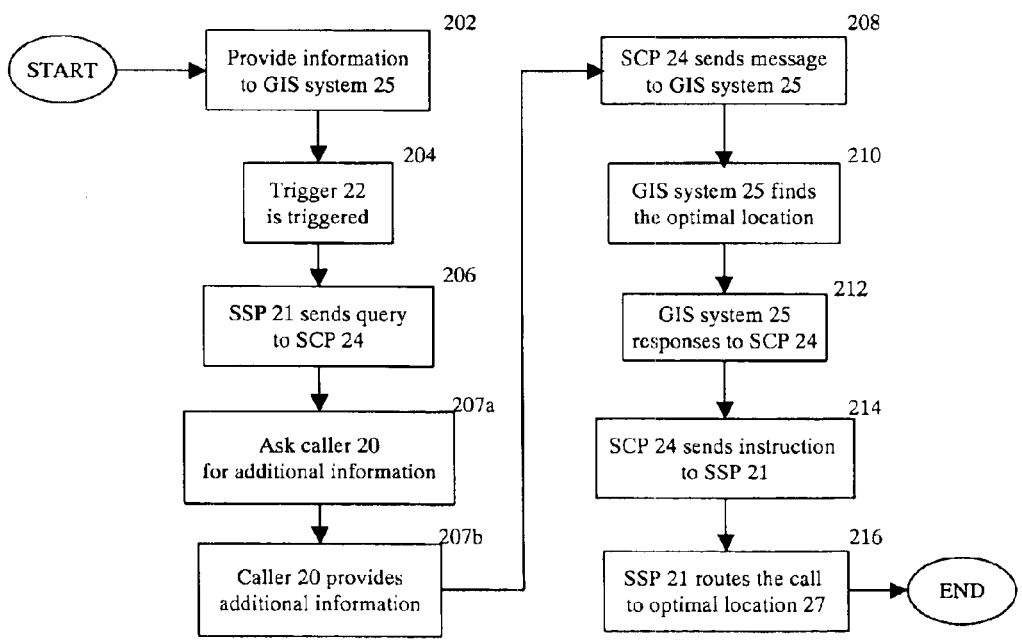
FIG. 2b is a flowchart illustrating the steps involved in using the second preferred embodiment of the present invention to route a call to the optimal location.

FIG. 2b is a flowchart illustrating the steps involved in using the second preferred embodiment of the present invention to route a call to the optimal location. Steps 202 through 206 of the second preferred embodiment are similar to corresponding steps 102 through 106 of the first preferred embodiment described above. In addition to the telephone numbers and X-Y coordinates of all locations of subscriber 26, GIS system 25 may also comprise one or more of telephone numbers, street addresses, and X-Y coordinates of all potential calling parties. Moreover, GIS system 25 further comprises the types of unique services each of subscriber 26's locations offers. In a specific example involving a family of car dealerships and related services, which advertises one designated telephone number for all of its Ford dealerships, Toyota dealerships, BMW dealerships, used car lots, and its body shops, GIS system 25 contains each location's unique feature, i.e., Ford, Toyota, BMW, used car lot, or body shop, in addition to the locations' telephone numbers, street addresses, and X-Y coordinates.

As stated above, steps 202 through 206 of the second preferred embodiment are similar to corresponding steps 102 through 106 of the first preferred embodiment. In step 207a, after SCP 24 receives the query from SSP 21, caller 20 is requested to provide additional information. The request may be made by the SCP or by other components in the network. In the specific example used for illustration of the second preferred embodiment, caller 20 is provided, in step 207a, a menu, e.g., press "1" for the closest Ford dealership, press "2" for the closest Toyota dealership, press "3" for the closest BMW dealership, press "4" for the closest used car lot, and press "5" for the closest body shop. In step 207b, caller 20 responds accordingly, e.g., caller 20 presses 1 because caller 20 wishes to be connected to the Ford dealership that is closest to him. In the preferred embodiment, the optimal location is not the closest location among all subscriber 26's locations. The optimal location in this instance is the Ford dealership that is closest to caller 20 among all Ford dealerships of subscriber 26.

Steps 208 through 216 of the second preferred embodiment are similar to corresponding steps 108 through 116 of the first embodiment described above with some variations noted below. In step 208, when SCP 24 receives caller 20's selection, SCP 24 sends a message to GIS system 25 to obtain a forwarding telephone number of the optimal location, i.e., the Ford dealership that is closest to caller 20. Again, messaging from SCP 24 to GIS system 25 may be done using any known methods or protocols although it is most preferred that the messaging be done via an application over the TCP/IP protocol. In step 210, GIS system 25, based on information contained in the message received from SCP 24, finds the location of subscriber 26 that is optimal to caller 20. In this specific car dealership example, although a Toyota dealership may be the physically closest location to caller 20, the Toyota dealership is not the optimal location in this example because caller 20 wants to be connected to a Ford dealership. The determination of the optimal location may be done using any known methods or algorithms as described in step 110 for the first preferred embodiment above.

In step 212, GIS system 25 responds to SCP 24, providing the forwarding telephone number of the optimal location to caller 20. When SCP 24 receives the message from GIS system 25, SCP 24 instructs SSP 21 in step 214 to route the call to the optimal location. In the example shown in FIG. 2a, the optimal location is optimal location 27, and the call is routed through SSP 21a in step 216. In the second preferred embodiment, a provision may be made to route the call from caller 20 to default location 28 designated by subscriber 26. This provision ensures that caller 20 is always routed to the default location if the system does not function as designed. For example, the call is routed to the default location when (1) GIS system 25 somehow fails to identify the optimal location, (2) messaging between SCP 24 and GIS system 25 is not properly established, or (3) caller 20 failed to select or selected an invalid option. Obviously, the call may be routed to the default location if other unanticipated event occurs. In one embodiment, the default location is subscriber 26's headquarters. In another embodiment, the default location is subscriber 26's customer service representative.

In addition to the car dealership example above, another practical application of the second preferred embodiment is for government agencies. For example, the "311" telephone number may be dedicated as the designated telephone numbers for all non-emergency government agencies. In step 207a, caller 20 may be offered, e.g., selection "1" for the police, "2" for the fire department, "3" for the animal control, "4" for the school board and so on.

Figure 3A:
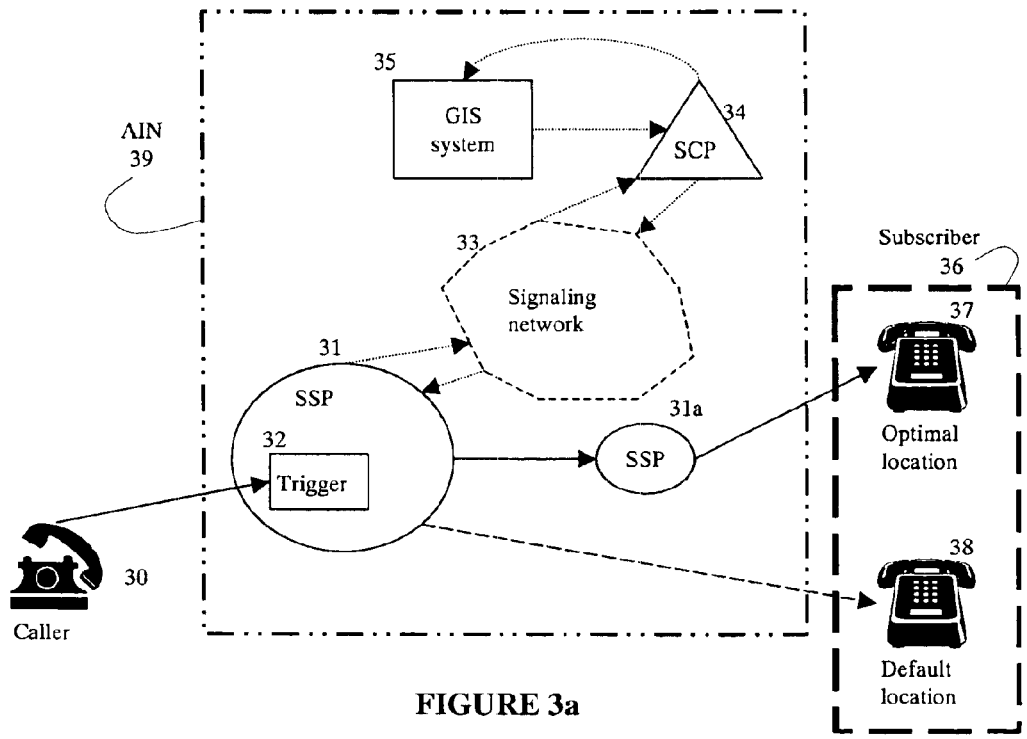
FIG. 3a is a schematic diagram illustrating the architecture of a third preferred embodiment of the present invention.

FIG. 3a is a schematic diagram illustrating the architecture of a third preferred embodiment of the present invention. The system shown in FIG. 3a is similar to that in FIG. 2a with one significant difference. In FIG. 3a, GIS system 35 is part of a telephone company's network. In this embodiment, GIS system 35 is maintained by a telephone company rather than by subscriber 36.

Figure 3B:
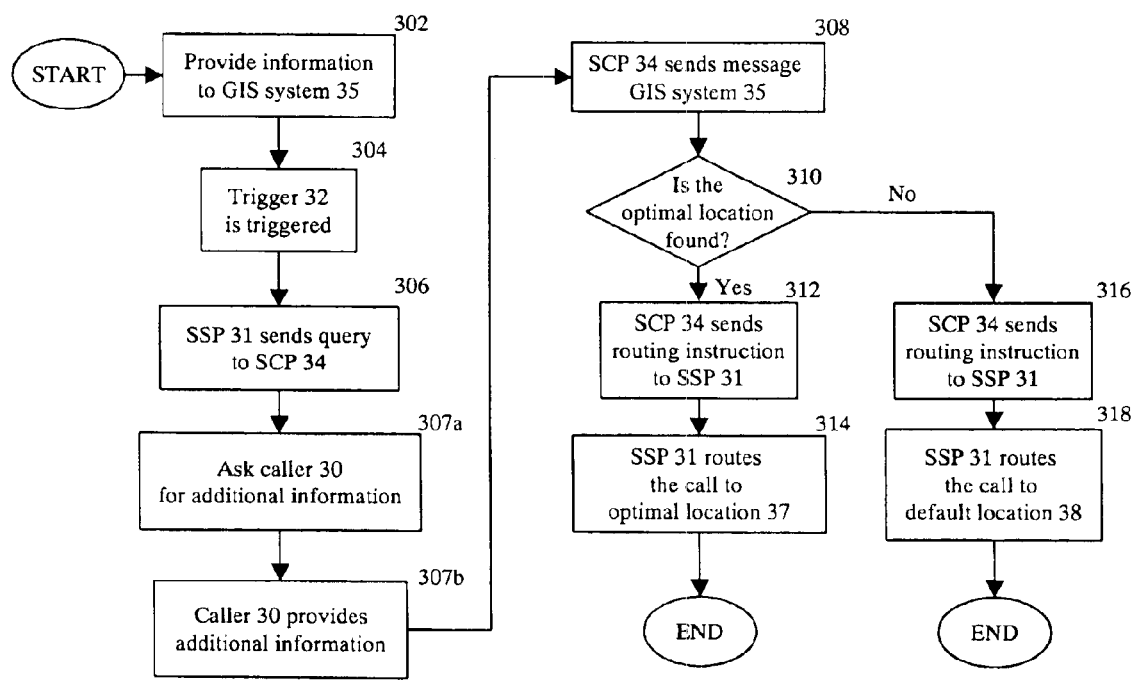
FIG. 3b is a flowchart illustrating the steps involved in using the third preferred embodiment of the present invention to route a call to the optimal location.

FIG. 3b is a flowchart illustrating the steps involved in using the third preferred embodiment of the present invention to locate the optimal location. Steps 302 through 308 are similar to corresponding steps 202 through 208. In step 310, a determination is made at GIS system 35 to find the optimal location. If the optimal location is found in step 310, the process goes to step 312 in which SCP 34 sends the routing instruction (which includes the forwarding telephone number of optimal location 37) to SSP 31. In step 314, SSP 31 routes the call to optimal location 37. But if in step 310 GIS system 15 fails to find the optimal location, the process goes to step 316 in which SCP 34 sends a different routing instruction to SSP 31. This time SCP 34 instructs SSP 31 to route the call to default location 38 designated by subscriber 36. The call is routed in step 318. The default location feature is useful to subscriber 36. For example, all calls for subscriber 36 will be routed to default location 38 if somehow GIS system 35 is not available or the system is otherwise not functioning as designed. The telephone number of the default location may be provided by GIS system 35, SCP 34, SSP 31, or any other components in the system.

Figure 4:
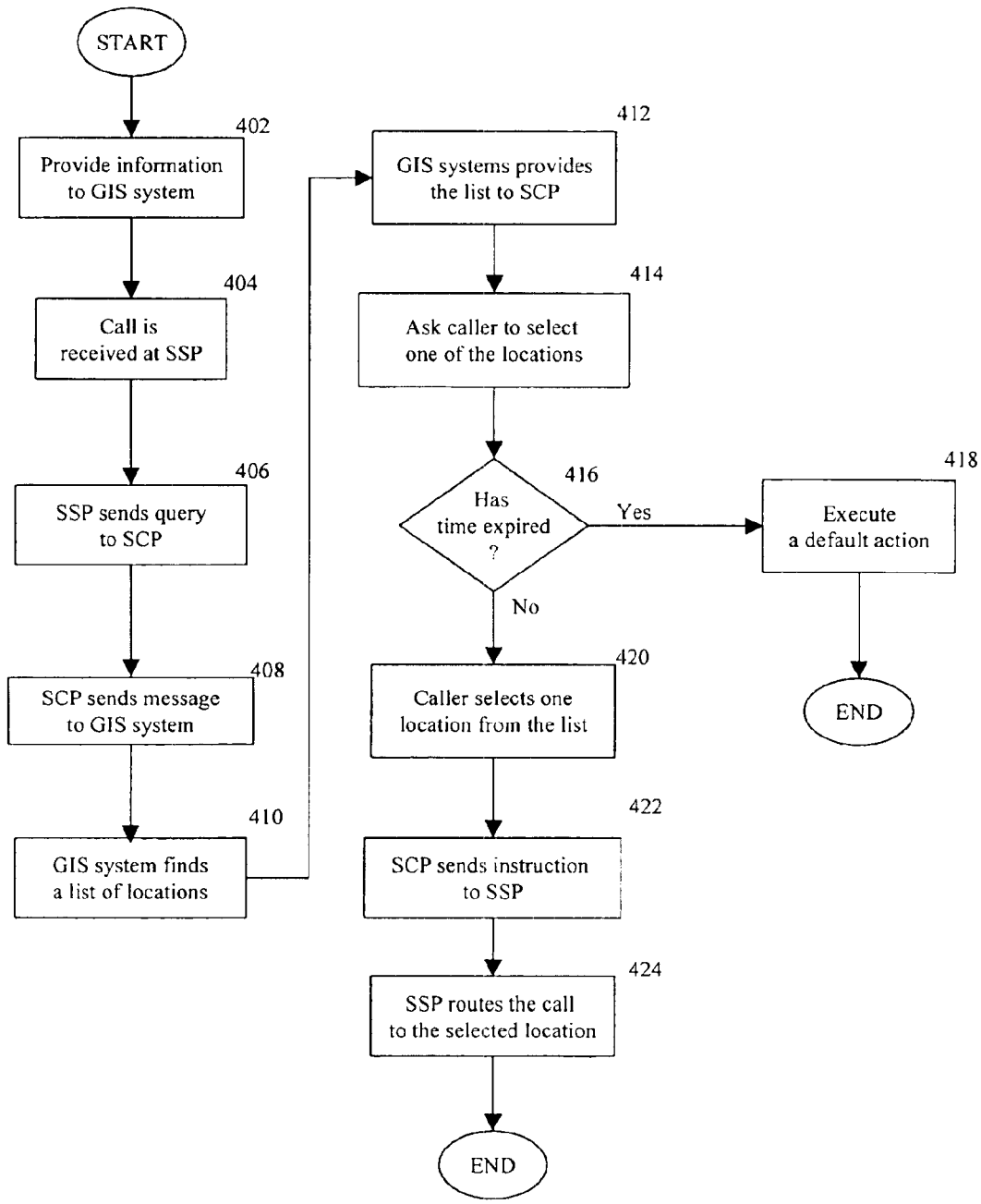
FIG. 4 is a flowchart illustrating the steps involved in using a fourth preferred embodiment of the present invention.

FIG. 4 is a flow chart illustrating the steps involved in using a fourth preferred embodiment of the present invention. Many of the steps in this embodiment are similar to corresponding steps described above for other preferred embodiments. For example, steps 402 through 408 in the fourth embodiment are similar to corresponding steps 102 through 108 of the first preferred embodiment, corresponding steps 202 through 208 of the second preferred embodiment, and corresponding steps 302 through 308 of the third preferred embodiment.

In step 410, the GIS database, based on information contained in a message, received from an SCP in step 408, retrieves a list of the subscriber's locations. The list preferably contains those locations that will most likely meet a calling party's need. For example, if the subscriber is a video rental franchise, then the list most preferably contains a number of video rental stores that are closest to the caller. A second caller residing in a different part of the country will receive a different list of video stores. The list also preferably includes a forwarding telephone number for each of the location on the list.

The list is then provided to the SCP in step 412. Again, an application over the TCP/IP is preferably used to transmit the list from the GIS system to the SCP. In step 414, the caller is asked to select one of the locations on the list. The selection may be solicited by a network implementing the present invention using any know methods. In this embodiment, the caller is asked to use the keypad on the caller's telephone to select an option from a menu. The menu may contain, for example, the following options: "press 1 for the store at 1234 Peachtree Street," "press 2 for the store at 456 Maple Avenue," "press 3 for the store in the Sycamore Shopping Mall," and "press 4 for a customer service representative."

The process then goes to step 416 in which a determination is made on whether a predetermined time duration, defined in a timer, has expired. If the time has expired before a response with respect to the menu is received from the caller, the process goes to step 418 in which a default action is executed. Any appropriate default action may be executed. In this preferred embodiment, the SCP instructs the SSP to route the call to a default location. The default location may be the subscriber's customer service representative. The default location may also be the subscriber's corporate headquarters. But if the caller responds in step 420 before the time expired in step 416 by pressing an appropriate key to select from the menu, the process goes to step 422. In step 422, the SCP sends a call routing instruction to the SSP. For example, if the caller pressed "3" in step 420, the SSP routes the call, in step 424, to the subscriber's store in the Sycamore Shopping Mall.

The timer feature introduced in step 416 in the fourth preferred embodiment may also be used in other embodiments, including the three preferred embodiments described above.

The present invention may also be used by any national organization having locations thorough the country. For example, the present invention may be adopted for use with 800 number toll free telephone services.

The foregoing disclosure of embodiments and specific examples of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A method for routing a call from a calling party to a called party comprising:

receiving the call intended for the called party at a service switching point;

querying a service control point for instructions to route the call;

providing X-Y coordinates of the calling party to a GIS system;

obtaining a menu of choices with an associated list of forwarding telephone numbers of the called party from the GIS system, wherein the forwarding telephone number is found by the GIS system based on the X-Y coordinates of the calling party and is provided to the service control point;

presenting the calling party with the menu of choices from the GIS system through the service control point;

receiving from the calling party a selection based on the menu of choices;

providing the selection to the service control point;

sending based on the selection a call routing instruction from the service control point to the service switch point; and routing the call based on the call routing instruction to a location associated with the forwarding telephone number associated with the selection.

2. The method of claim 1, wherein the location is an optimal location based on criteria set by the called party.

3. The method of claim 2, wherein the optimal location is a location that is physically closest to the calling party.

4. The method of claim 2, wherein the optimal location is a location that has the least travel time from the calling party.

5. The method of claim 1, wherein the location is an optimal location based on the selection received from the calling party.

* * * * *

UNITED STATES PATENT AND TRADEMARK OFFICE
CERTIFICATE OF CORRECTION

PATENT NO. : 6,879,676 B1
APPLICATION NO. : 09/606063
DATED : April 12, 2005
INVENTOR(S) : Contractor It is certified that error appears in the above-identified patent and that said Letters Patent is hereby corrected as shown below:

Drawing 1 of 4, delete hand-drawn marks.

Drawing 2 of 4, delete hand-drawn marks.

Column 3, line 56, "(ide, shortest route)" should read --(i.e., shortest route)--.

Column 8, line 9, "thorough" should read --through out--.

Signed and Sealed this

Sixteenth Day of October, 2007

JON W. DUDAS
*Director of the United States Patent and Trademark Office*